United States Patent [19]
Berglund

[11] 4,131,248
[45] Dec. 26, 1978

[54] OPTICAL RANGE RESOLUTION SYSTEM
[75] Inventor: David B. Berglund, Grand Prairie, Tex.
[73] Assignee: E-Systems, Inc., Dallas, Tex.
[21] Appl. No.: 712,722
[22] Filed: Mar. 13, 1968
[51] Int. Cl.² .................... F42B 15/02; F41G 9/00; F41G 11/00
[52] U.S. Cl. .................... 244/3.16; 356/152
[58] Field of Search .................... 350/96; 244/3.16
[56] References Cited
U.S. PATENT DOCUMENTS

| | | | |
|---|---|---|---|
| 3,234,329 | 2/1966 | Eisner | 350/96 |
| 3,325,594 | 6/1967 | Goldhammer et al. | 350/96 |

*Primary Examiner*—Samuel W. Engle
*Assistant Examiner*—Thomas H. Webb
*Attorney, Agent, or Firm*—Robert V. Wilder

[57] ABSTRACT

Disclosed is improved sensor apparatus for guidance systems, and the sensor apparatus includes means for receiving light reflected from a target and for processing this light to provide steering signals to the missile guidance and control mechanism; more specifically, the sensor apparatus includes means for receiving a single pulse of light reflected from the target and for forming a two-dimensional image therefrom, quantizing the data from the image, and re-forming the quantized data into a straight-line image from which a time-dependent signal is generated to be input to the missile control mechanism.

12 Claims, 3 Drawing Figures

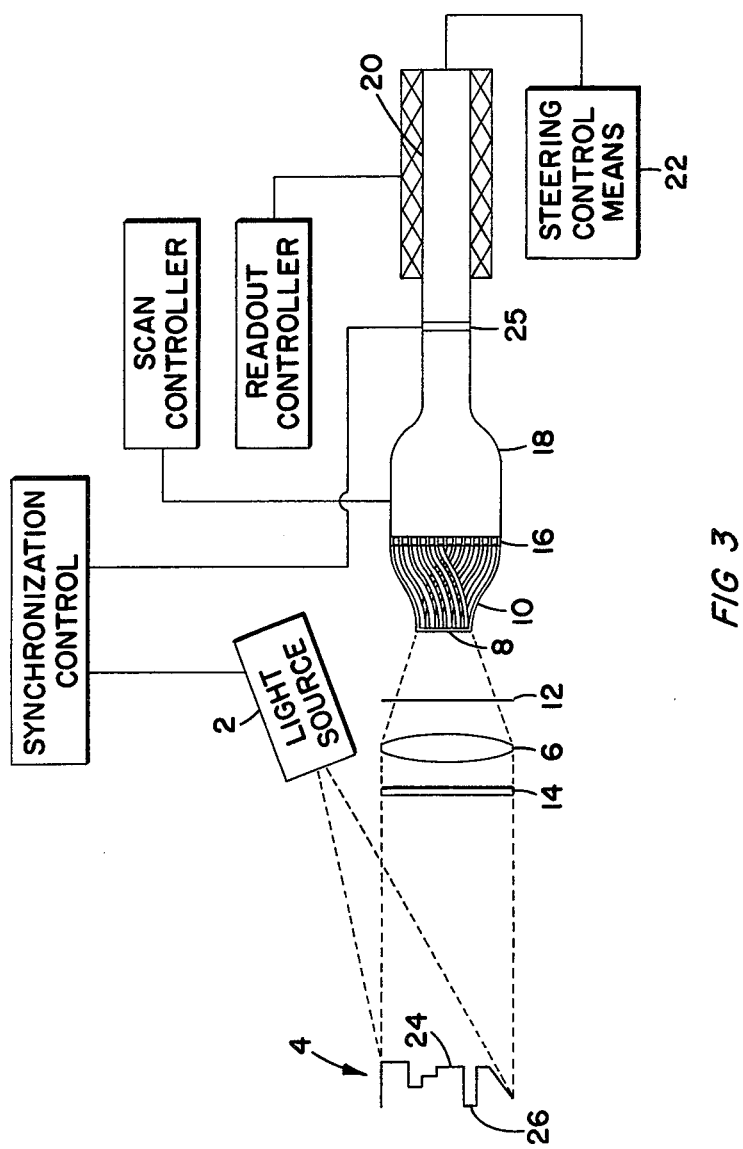

OPTICAL RANGE RESOLUTION SYSTEM

This invention relates to range detection systems and is particularly directed to sensor apparatus for fine contour resolution, such as may be useful in terminal guidance of missiles.

It will be apparent that terminal guidance systems for missiles and the like require sensing devices which are capable of extremely fine resolution. Thus, it is desirable to resolve areas of the order of 10 × 10 feet and ranges of about five feet. Numerous terminal guidance systems have been proposed heretofore. However, none of the prior art systems have been entirely satisfactory. Many of the prior art systems have failed to achieve the desired resolution. Other proposed systems have been too bulky. Still other prior art systems have been extremely complex and, hence, have been delicate and unreliable.

These disadvantages of the prior art are overcome with the present invention and a sensor apparatus is provided which satisfies the resolution requirements of terminal guidance systems; yet which is rugged, reliable and relatively compact. The advantages of the present invention are preferably attained by providing an optical sensor apparatus wherein light of a single pulse reflected from a target scene is focused to form a two-dimensional image on one end of a fibre optic bundle. The fibre optic bundle converts the two-dimensional image to a straight line image and applies the straight line image to the photocathode of a scanable image converter tube. The image converter tube yields a two-dimensional display wherein each element of the straight line image is displaced in a manner indicative of the range thereto. This two-dimensional display is then converted to an electrical signal which is applied to control the steering mechanism of the missile. The two-dimensional display of range or contour measurements may be correlated with a stored set of contours to effect the measurement of heading error.

Accordingly, it is an object of the present invention to provide a sensor apparatus for terminal guidance systems of missiles and the like.

Another object of the present invention is to provide a sensor apparatus having high resolution capabilities for terminal guidance of missiles and the like.

A further object of the present invention is to provide a sensor apparatus for terminal guidance systems which is rugged and reliable, yet is relatively compact.

Another object of the present invention is to provide a sensor for contour measurement.

A specific object of the present invention is to provide a sensor apparatus for terminal guidance systems of missiles and the like wherein light reflected from a target scene is focused to form a two-dimensional image on one end of a fibre optic bundle which converts the two-dimensional image to a straight line image and applies the straight line image to the photocathode of a scannable image converter tube whose output is a two-dimensional display wherein each element of the straight line image is displaced in a manner indicative of the range thereto and the two-dimensional display is converted to an electrical signal which is applied to control the steering mechanism of the missile.

These and other objects and features of the present invention will be apparent from the following detailed description taken with reference to the figures of the accompanying drawing.

In the drawing:

FIG. 3 is a diagrammatic representation of an alternate embodiment of the sensor apparatus shown in FIG. 1.

Figure 1:
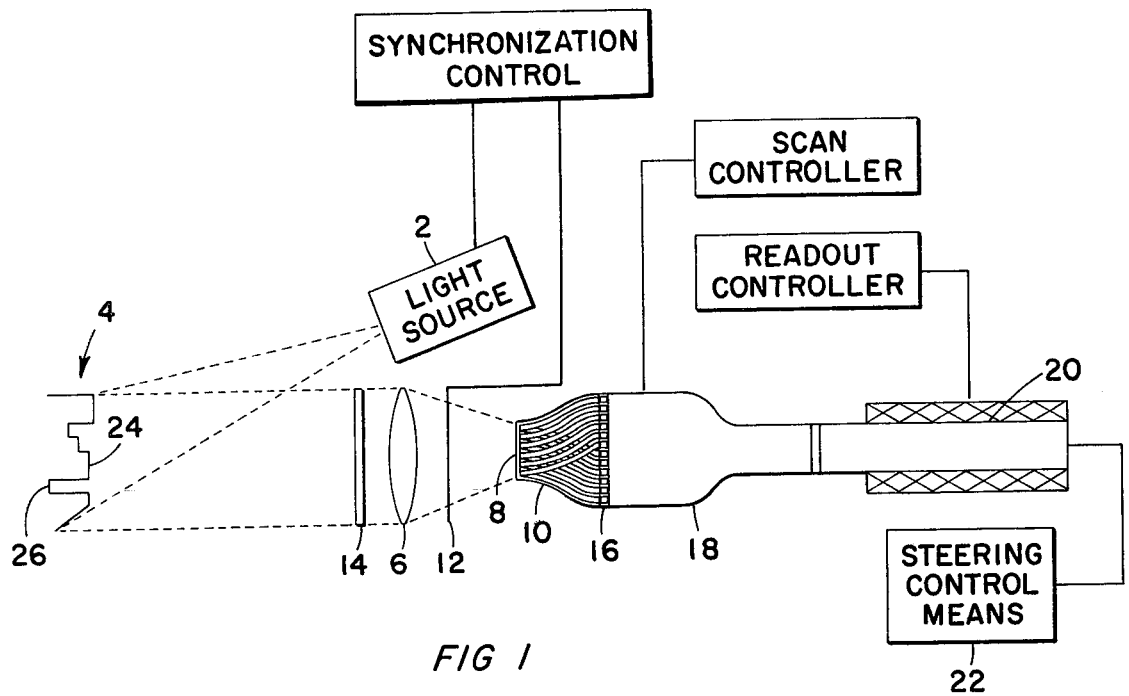
FIG. 1 is a diagrammatic representation of a sensor apparatus embodying the present invention.
Figure 2:
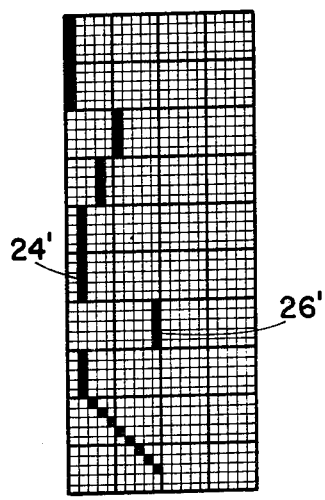
FIG. 2 is a diagrammatic representation of the display applied to the photocathode of the image orthicon or other readout tube of the sensor apparatus of FIG. 1, showing the elements of the straight line image displaced as functions of time.

In that form of the present invention chosen for purposes of illustration, FIG. 1 shows a light source 2 floodlighting a target scene, indicated at 4. The light source 2 may be carried by the missile and is preferably a high-intensity source which may be actuated to provide successive light pulses having extremely short rise times. Pulsed or "Q-spoiled" lasers are well suited to this purpose and have the additional advantage of emitting infrared light which permits covert operation at night. Obviously, if desired, ultraviolet light sources could also be used for covert night operations. Light from source 2 is reflected by the target scene 4 and is focused by lens 6 to form a two-dimensional image on the adjacent end 8 of a fibre optic bundle 10. If desired, shutter means 12 may be provided adjacent the lens 6 and may be synchronized with source 2 so that the shutter 12 is open approximately only during the occurrence of target area reflected light pulses from source 2 to minimize the effects of background or extraneous light. Alternatively, as shown in FIG. 3, the function of shutter means 12 may be accomplished by synchronizing the control grid 25 of image converter tube 18 with the light source 2 to cause the image converter tube 18 to pass electrons only during intervals when target area reflected light pulses from source 2 are expected. Similarly, if desired, filter means 14 may be provided adjacent lens 6 to pass only light of a desired wavelength, such as the wavelength of the source 2. As is well known, a fibre optic bundle comprises a plurality of flexible, light-conducting fibres or "light pipes" secured together to form a unitary bundle. In accordance with the present invention, the respective light pipes of the fibre optic bundle 10 have one end, adjacent end 8 of bundle 10, cooperating with the adjacent light pipes and oriented to define a quantized, two-dimensional area approximating the size of the image formed by lens 6; while the opposite ends of the light pipes, adjacent end 16 of bundle 10, are fanned out and oriented in single file, one above the other. With this arrangement, the output of end 16 of the fibre optic bundle 10 will be a quantized, straight line image with each quanta thereof connected by a respective light pipe to a corresponding quanta of the two-dimensional image applied to end 8 of the bundle 10 by the lens 6. The straight line image from end 16 of the fibre optic bundle 10 is applied to the photocathode of a scanable image converter tube 18 which may have a fibre optic face plate for improved light transfer efficiency and which causes the straight line image to be scanned as a function of time in a direction perpendicular to that of the straight line image to produce a two-dimensional display, as seen in FIG. 2. The display of image converter tube 18 is applied to the photocathode of an image orthicon tube 20, or like means, which converts the display to an electrical signal that is applied to a correlator to derive aim point error signals to control the steering mechanism 22 of the missile.

In operation, light from source 2 is reflected by objects in the target area 4 and the reflected light is focused by lens 6 to form a two-dimensional image on the input end 8 of the fibre optic bundle 10. This two-dimensional image is quantized by the fibre optic bundle 10 and is converted to a quantized, straight line image which is applied to the photocathode of scanable image converter tube 18 which causes the straight line image to be scanned as a function of time in a direction perpendicular to that of the straight line image to produce a two-dimensional display, as seen in FIG. 2. It will be seen that, where objects of different range are present in the target area 4, as indicated at 24 and 26, any given light pulse from source 2 will be reflected independently by the objects 24 and 26 and will appear in the straight line image applied to the photocathode of the image converter tube 18 as two distinct pulses separated in time by an interval equal to the speed of light times twice the difference in range between the objects 24 and 26, and separated in space due to the quantizing effect of the fibre optic bundle 10. Although the time interval between the arrivals of the two reflected pulses will be extremely small, the effect is amplified in the image converter tube 18 by scanning the straight line image in a direction perpendicular to that of the straight line image. When this is done, the output of the image converter tube 18 is a two-dimensional display, as seen in FIG. 2, with each quanta of the straight line image represented therein but being laterally displaced by a distance indicative of the arrival time of the pulse at the respective quanta of the straight line image. Thus, the arrival times of the reflected pulses from objects 24 and 26 of FIG. 1 are represented at 24' and 26', respectively, in the two-dimensional display of FIG. 2. Using the technique of the present invention, it has been demonstrated that object range differences as small as one to three feet can be resolved at missile-to-target area ranges of 1,500 feet, and it is believed that similar resolution could be obtained at missile-to-target area ranges of as much as 5,000.

The two-dimensional display of FIG. 2 is applied by the image converter tube 18 to the photocathode of a image orthicon 20 which converts the display to an electrical signal and applies the electrical signal to suitable steering control means 22 which employs this signal to determine the range and direction to each segment of the target area, correlates this signal with a stored pattern, and can steer the missile accordingly.

Obviously, numerous variations and modifications may be made without departing from the present invention. Accordingly, it should be clearly understood that the form of the invention described above and shown in the figures of the accompanying drawing is illustrative only and is not intended to limit the scope of the present invention.

What is claimed is:

1. Sensor apparatus for guidance systems, said sensor apparatus comprising:
    means receiving light of a single pulse reflected from a target area and focusing said reflected light to form a two-dimensional image,
    means receiving said two-dimensional image and operable to convert said two-dimensional image into a quantized, straight line image,
    means receiving said straight line image and converting said straight line image into a two-dimensional display wherein each quanta of said straight line image is displayed in a time-dependent position,
    means receiving said two-dimensional display and converting said display into an electrical signal,
    steering control means forming a part of said guidance system, and
    means applying said electrical signal to said steering control means.

2. Sensor apparatus for guidance systems, said sensor apparatus comprising:
    lens means receiving light of a single pulse reflected from a target area and focusing said reflected light to form a two-dimensional image;
    a fibre optic bundle having input and output ends and formed of a plurality of light-conducting fibres oriented adjacent the input end of said bundle to define a two-dimensional area approximating the size of said two-dimensional image and positioned to receive said two-dimensional image, and oriented in single file adjacent the output end of said bundle to form a straight line image;
    a scanable image converter tube having a photocathode positioned to receive said straight line image and including means for deflecting electrons emitted by said photocathode in a time-dependent manner and in a direction perpendicular to that of said straight line image to provide a two-dimensional display;
    means for receiving said two-dimensional display and converting said display into an electrical signal;
    steering control means forming a part of said guidance system; and
    means applying said electrical signal to said steering control means.

3. The sensor apparatus of claim 2 further comprising:
    light source means emitting periodic pulses of light to illuminate said target area.

4. The sensor apparatus of claim 3 wherein:
    said light source emits infrared light.

5. The sensor apparatus of claim 3 wherein:
    said light source emits ultraviolet light.

6. The sensor apparatus of claim 3 wherein:
    said light source emits visible light.

7. The sensor apparatus of claim 3, wherein:
    said light source emits light pulses having rapid rise times.

8. The sensor apparatus of claim 3, wherein:
    said light source is a pulsed laser.

9. The sensor apparatus of claim 3, wherein:
    said light source is a Q-spoiled laser.

10. The sensor apparatus of claim 3, further comprising:
    shutter means positioned adjacent said lens means and synchronized with said light source to permit passage of light only during intervals when light emitted from said light source is expected to be present.

11. The sensor apparatus of claim 2, further comprising:
    filter means positioned adjacent said lens means to pass only light having frequencies within a desired range.

12. The sensor aparatus of claim 3 further comprising:
    a control grid within the scanable image converter tube synchronized with said light source to permit passage of electrons only during intervals when electrons from the received light are expected.

* * * * *